(12) United States Patent
Seo

(10) Patent No.: US 11,469,011 B2
(45) Date of Patent: Oct. 11, 2022

(54) METHOD FOR PRODUCING TRANSPARENT ELECTRODE

(71) Applicant: ITED INC., Daejeon (KR)

(72) Inventor: Jee-Hoon Seo, Namyangju-si (KR)

(73) Assignee: ITED Inc., Daejeon (KR)

( * ) Notice: Subject to any disclaimer, the term of this patent is extended or adjusted under 35 U.S.C. 154(b) by 284 days.

(21) Appl. No.: 16/958,617

(22) PCT Filed: Nov. 14, 2018

(86) PCT No.: PCT/KR2018/013941
§ 371 (c)(1),
(2) Date: Jun. 26, 2020

(87) PCT Pub. No.: WO2019/132243
PCT Pub. Date: Jul. 4, 2019

(65) Prior Publication Data
US 2020/0335243 A1    Oct. 22, 2020

(30) Foreign Application Priority Data

Dec. 29, 2017 (KR) .......................... 10-2017-0183639

(51) Int. Cl.
| | | |
|---|---|---|
| *H01B 5/14* | (2006.01) | |
| *H01B 1/02* | (2006.01) | |
| *B05D 5/12* | (2006.01) | |
| *H01B 13/00* | (2006.01) | |

(52) U.S. Cl.
CPC ........... *H01B 13/0026* (2013.01); *B05D 5/12* (2013.01); *H01B 1/02* (2013.01); *H01B 5/14* (2013.01); *H01B 13/0016* (2013.01)

(58) Field of Classification Search
CPC ... H01B 1/00; H01B 1/02; H01B 5/15; H05K 1/02; B05D 3/06; B05D 3/107; B05D 3/108; B05D 5/12; B05D 2201/00; B05D 2203/30
See application file for complete search history.

(56) References Cited

U.S. PATENT DOCUMENTS

| | | | |
|---|---|---|---|
| 9,826,636 B2 * | 11/2017 | Park | ...................... H01L 51/444 |
| 9,965,124 B2 * | 5/2018 | Yamai | ...................... H01B 1/22 |
| 2011/0094651 A1 | 4/2011 | Kuriki | |
| 2014/0000943 A1 | 1/2014 | Kang et al. | |

(Continued)

FOREIGN PATENT DOCUMENTS

| | | |
|---|---|---|
| JP | 2011-090878 A | 5/2011 |
| KR | 10-1191865 B1 | 10/2012 |

(Continued)

OTHER PUBLICATIONS

English translation of PCT/ISA/237 (mailed Feb. 2019).*

(Continued)

*Primary Examiner* — Mark Kopec
(74) *Attorney, Agent, or Firm* — Knobbe Martens Olson & Bear LLP

(57) ABSTRACT

A transparent electrode or a transparent heat trace is manufactured by transferring a silver nanowire formed on a glass substrate to a polymer and a flexible film. When the silver nanowire transferred to the polymer and the flexible film is processed with an iodine mixture, a surface of the silver nanowire is discolored.

6 Claims, 13 Drawing Sheets

(56) References Cited

U.S. PATENT DOCUMENTS

| | | | |
|---|---|---|---|
| 2014/0021400 A1* | 1/2014 | Coenjarts | C03C 15/00 |
| | | | 252/79.4 |
| 2015/0009432 A1* | 1/2015 | Katagiri | G02F 1/13439 |
| | | | 430/311 |
| 2016/0013971 A1 | 5/2016 | Yamai et al. | |
| 2016/0198571 A1 | 7/2016 | Park | |
| 2020/0137891 A1* | 4/2020 | Seo | H05K 1/18 |

FOREIGN PATENT DOCUMENTS

| | | |
|---|---|---|
| KR | 10-2016-0059531 A | 5/2016 |
| KR | 10-2016-0084715 A | 7/2016 |
| WO | WO 2015/019805 A1 | 2/2015 |

OTHER PUBLICATIONS

International Search Report dated Feb. 12, 2019 in International Application No. PCT/KR2018/013941, in 9 pages. (English translation of ISR).

* cited by examiner

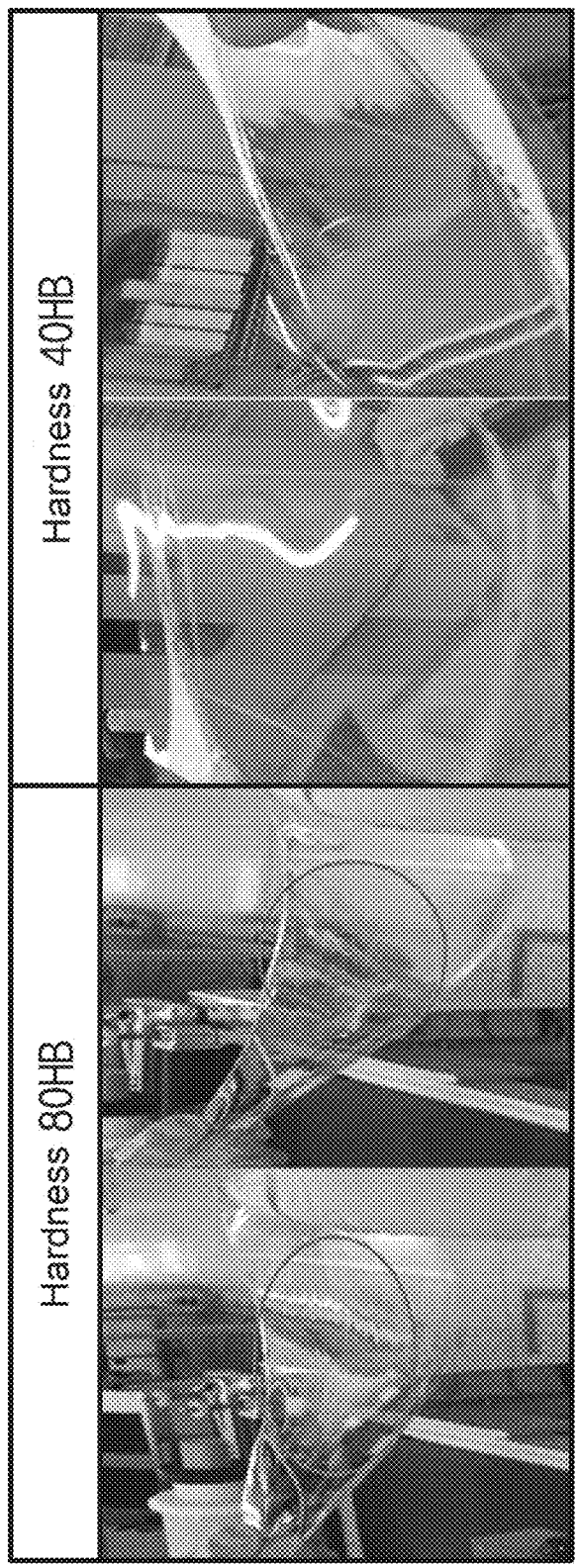

METHOD FOR PRODUCING TRANSPARENT ELECTRODE

The present application is a U.S. national phase application under 35 U.S.C. § 371 of International Application No. PCT/KR2018/013941, filed on Nov. 14, 2018, which claims the benefit of Korean Patent Applications No. 10-2017-0183639 filed on Dec. 29, 2017, in the Korean Intellectual Property Office, the entire disclosure of each of which is incorporated herein by reference.

BACKGROUND

1. Field

The present invention relates to a method for manufacturing a transparent electrode or a transparent heat trace comprising silver nanowires.

2. Description of Related Art

Electrodes are widely used in various fields. A role of the electrode is to transfer an electric charge to each electric element and, thus, serves to transfer energy to drive each electric element. Therefore, it is essential to have resistivity and stability as low as possible. In general, metals such as silver and copper are the main materials forming the electrode and transparent electrodes such as ITO are widely used in the display field.

The transparent electrode is an electronic component having a high transparency of 80% or more and is, thus, widely used in electronic fields such as displays such as LCD front electrodes and OLED electrodes, touch screens, solar cells, and optoelectronic devices. Indium tin oxide (hereinafter referred to as 'ITO') is commonly used in these devices as the transparent electrode. ITO electrodes have many advantages such as optical transparency, electrical conductivity, and environmental stability.

However, since ITO electrodes applied to existing touch screen panels (TSPs) are less flexible and difficult to be used for flexible or curved flexible displays, graphene, CNT, and silver nanowire (AgNW) are attracting attention as new materials to replace ITO films.

Among them, silver nanowires are electrodes having high conductivity and electrical conductivity. Therefore, the demand for transparent electrodes including silver nanowires is increasing.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An object of the present invention is to provide a method for manufacturing a transparent electrode or a transparent heat trace having low sheet resistance, good flexibility, and improved visibility.

According to an embodiment of the present invention, there is provided a method for manufacturing transparent electrodes comprising: preparing a base substrate; forming a silver nanowire contacting one surface of the base substrate; heating the base substrate and the silver nanowire at a predetermined temperature; applying an uncured polymer to the one surface of the base substrate to cover the silver nanowire; disposing a flexible film on the uncured polymer; applying a predetermined pressure between the disposed flexible film and the base substrate; irradiating light having a specific wavelength on the flexible film and curing the uncured polymer to change to a cured polymer; separating the base substrate and the cured polymer so that the silver nanowire is separated from the base substrate and bonded to the cured polymer, thereby forming a silver nanowire assembly comprising the silver nanowire, the cured polymer, and the flexible film; exposing the silver nanowire assembly to an iodine mixture for a predetermined time to change color of only a part of the surface of the silver nanowire to gray or black color; and annealing the silver nanowire assembly exposed to the iodine mixture.

In one embodiment of the present invention, the base substrate may be a glass substrate.

In one embodiment of the present invention, the base substrate may be a granite surface plate.

In one embodiment of the present invention, the flexible film may include PET.

In one embodiment of the present invention, the predetermined temperature may be 200° C. to 300° C.

In one embodiment of the present invention, the predetermined pressure may be applied by rolling of a roller. A hardness of the roller may be 30 HB to 50 HB.

In one embodiment of the present invention, the iodine mixture may include a chloride-based mixture. The iodine mixture may further include potassium.

In one embodiment of the present invention, the part of the silver nanowire changed to gray or black color may be silver chloride.

In one embodiment of the present invention, the annealing may be conducted at a temperature of 100° C. to 150° C. for 2-5 minutes.

According to an embodiment of the present invention, there is provide a method for manufacturing transparent electrodes, the method comprising: preparing a base substrate; forming a silver nanowire contacting one surface of the base substrate; heating the base substrate and the silver nanowire at a predetermined temperature; discoloring color of a part of the silver nanowire to gray or black color by exposing the silver nanowire to an iodine mixture for a predetermined time; applying an uncured polymer to the one surface of the base substrate to cover the discolored silver nanowire; disposing a flexible film on the uncured polymer; applying a predetermined pressure between the disposed flexible film and the base substrate; irradiating light having a specific wavelength on the flexible film and curing the uncured polymer to change to a cured polymer; separating the base substrate and the cured polymer so that the discolored silver nanowire is separated from the base substrate and bonded to the cured polymer, thereby forming a silver nanowire assembly comprising the discolored silver nanowire, the cured polymer, and the flexible film; and annealing the silver nanowire assembly.

According to an embodiment of the present invention, the silver nanowire is disposed on the flexible film to provide a transparent electrode or a transparent heat trace having improved flexibility.

Furthermore, the silver nanowire has low sheet resistance to provide a transparent electrode or a transparent heat trace that can be implemented in a large area.

Furthermore, appearance of fogging (haze) when viewed with the naked eye is reduced to provide a transparent electrode or a transparent heat trace with improved visibility.

Furthermore, the silver nano e is disposed at a certain depth on the flexible film to provide a transparent electrode or a transparent heat trace with improved durability.

BRIEF DESCRIPTION OF THE DRAWINGS

FIG. 5B is a diagram illustrating comparison of the processing quality of the flexible films according to the hardness of the roller of FIG. 5A.

DETAILED DESCRIPTION

Figure 1:
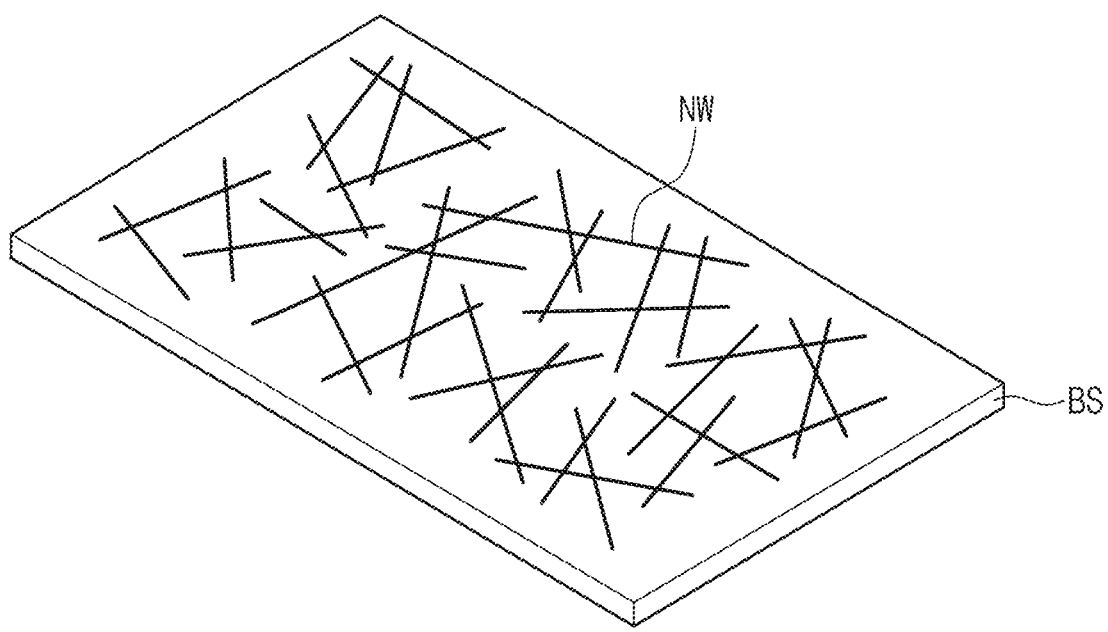
FIG. 1 is an example illustrating an arrangement of silver nanowires on a base substrate.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The terms used in the description are intended to describe certain embodiments only, and shall by no means restrict the present disclosure. Unless clearly used otherwise, expressions in the singular number include a plural meaning. In the present description, an expression such as "comprising" or "consisting of" is intended to designate a characteristic, a number, a step, an operation, an element, a part or combinations thereof, and shall not be construed to preclude any presence or possibility of one or more other characteristics, numbers, steps, operations, elements, parts or combinations thereof.

In the drawings, the proportions and dimensions of components are exaggerated for effective description of technical content.

Embodiments of the disclosure will be described below in more detail with reference to the accompanying drawings, in which those components are rendered the same reference number that are the same or are in correspondence, regardless of the figure number, and redundant explanations are omitted.

Figure 9:
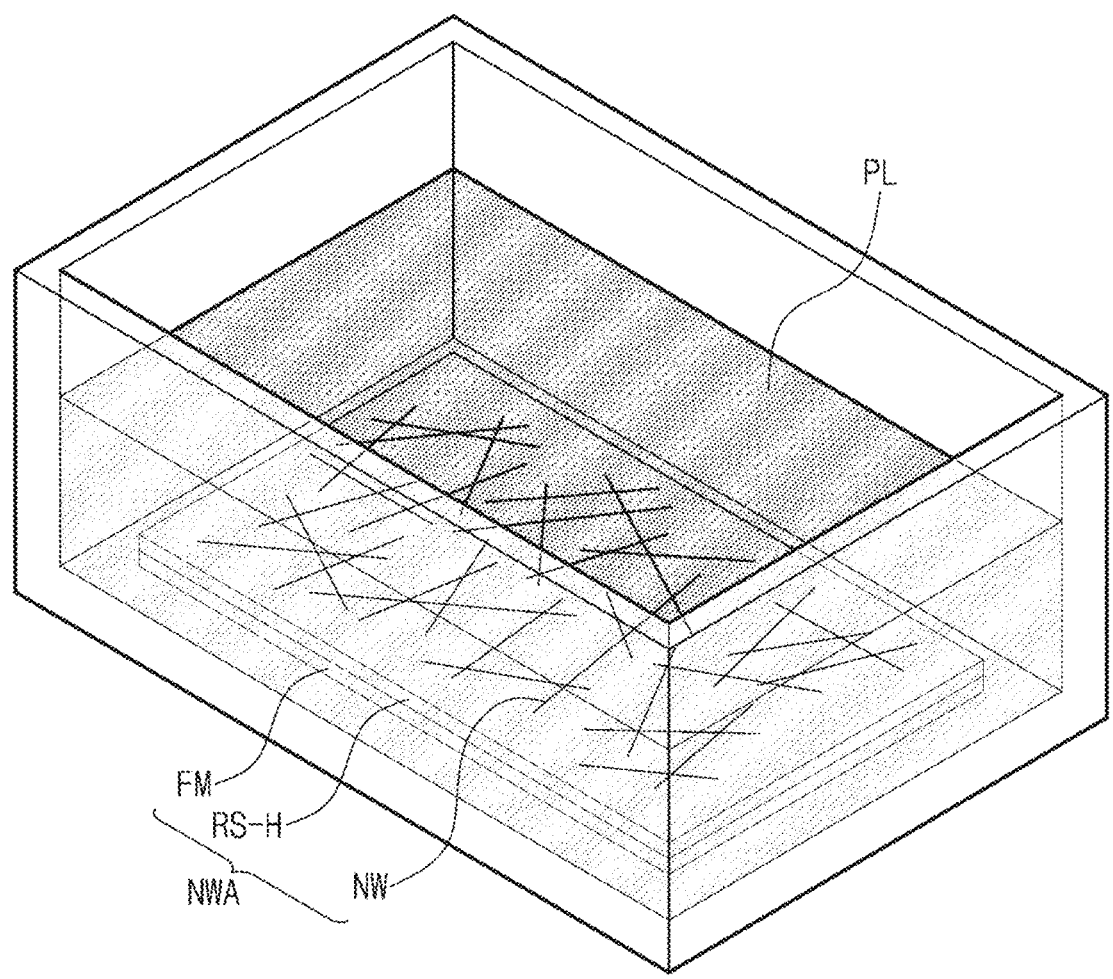
FIG. 9 is an example illustrating processing the silver nanowire assembly of FIG. 8A with a solution including an iodine mixture.
Figure 10A:
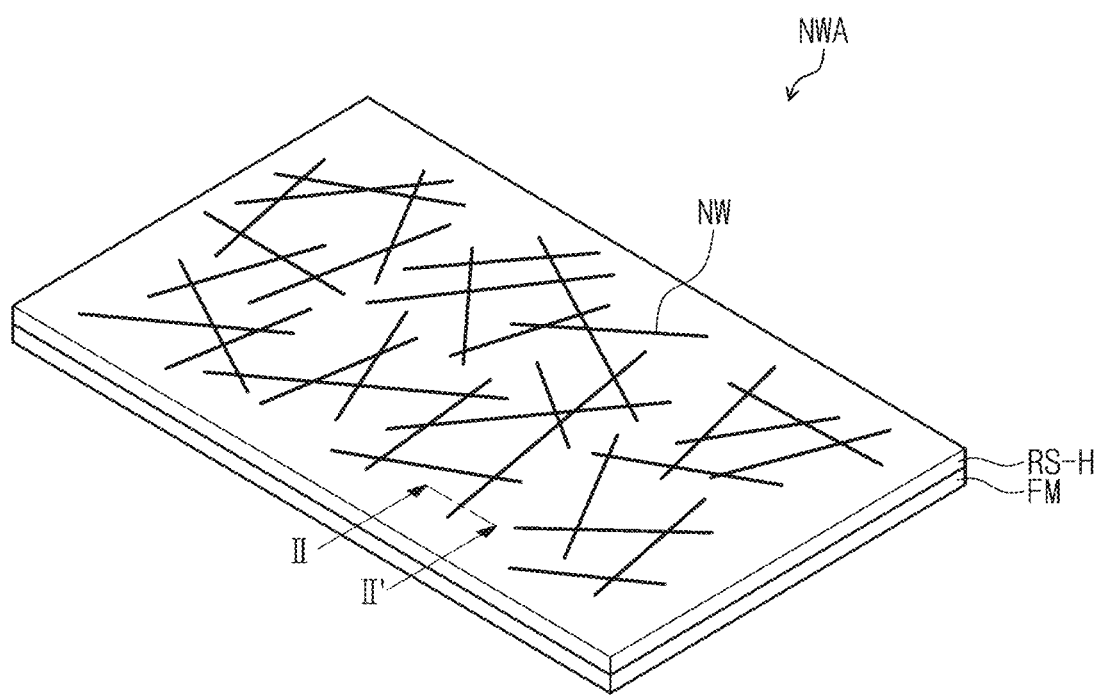
FIG. 10A is an example illustrating a silver nanowire assembly processed by an iodine mixture.
Figure 10B:
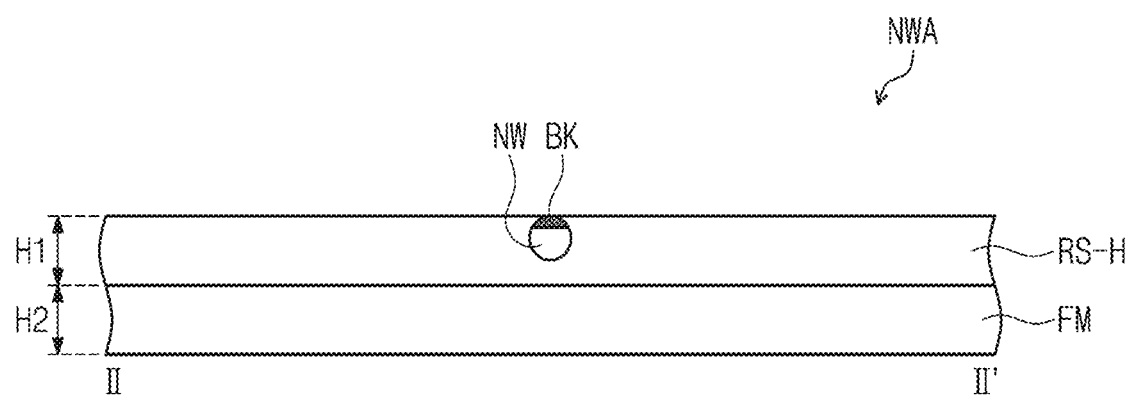
FIG. 10B is an example illustrating a cross-section taken along line of FIG. 10A.
Figure 11:
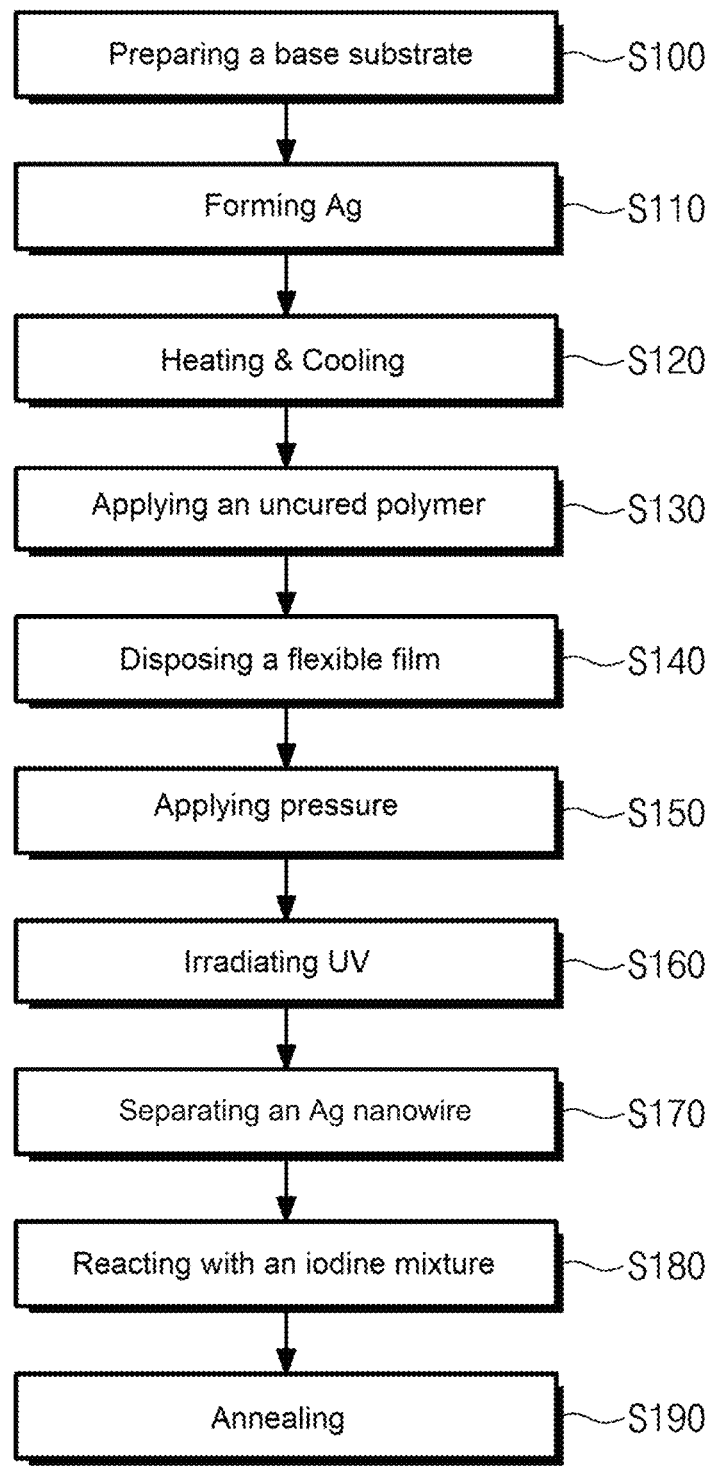
FIG. 11 is a flowchart illustrating a method for manufacturing a transparent electrode according to an embodiment of the present invention.

FIG. 1 to FIG. 10B exemplarily illustrate a method for manufacturing transparent electrodes according to an embodiment of the present invention. FIG. 11 is a flowchart illustrating a method for manufacturing a transparent electrode according to an embodiment of the present invention.

FIG. 1 is an example illustrating an arrangement of silver nanowires on a base substrate BS.

The base substrate BS may be a glass substrate or a granite surface plate. Glass substrates and granite surface plates are highly heat-resistant. Therefore, there is an advantage that deformation does not occur even if a high temperature of 200° C. or more is applied later in a heat treatment process.

The silver nanowires NW are directly disposed on the base substrate BS. At this time, a method such as dispensing, bar coating, slot die coating, using an applicator, spin coating, or spray coating may be used.

According to an embodiment of the present invention, when coating the silver nanowires using a spin coater, after dropping a silver nanowire ink onto the glass substrate, the spin coater is maintained at 1000 to 3000 rpm to coat the silver nanowires. If it deviates from the above condition, it is not possible to coat the silver nanowires NW with a uniform thickness on the base substrate BS.

According to an embodiment of the present invention, when coating the silver nanowires using a bar coater, it may be conducted at 1 to 100 cm/sec.

According to an embodiment of the present invention, when coating the silver nanowires using a spray coater, a nozzle size of 0.2 to 0.3 may be applied at a pressure of 1 to 5 $kgf/cm^2$ to coat the silver nanowires on the base substrate.

According to an embodiment of the present invention, when coating the silver nanowires using an applicator, a silver nanowire ink may be dropped in a row and then the silver nanowires may be coated at 1 to 100 cm/sec.

When the above-described conditions are not satisfied, the silver nanowires NW may not be coated on the base substrate BS with a uniform thickness.

The silver nanowire NW having a size of 1 to 100 nm in diameter and 2 to 100 μm in length may be used. If the diameter is less than 5 nm, the mechanical stability becomes very weak, so it can be easily broken and difficult to maintain a stable network shape. On the other hand, if it exceeds 100 nm, the transparency (light transmittance) rapidly decreases to 70% or less.

If the length is less than 2 μm, since the length of the silver nanowires constituting the network becomes too short, a large number of silver nanowires are required, transparency is lowered, and electrical conductivity is deteriorated due to many contact points. On the other hand, if it exceeds 100 μm, manufacturing the silver nanowires becomes difficult and the silver nanowires can be easily broken due to their long lengths during coating.

Figure 2A:
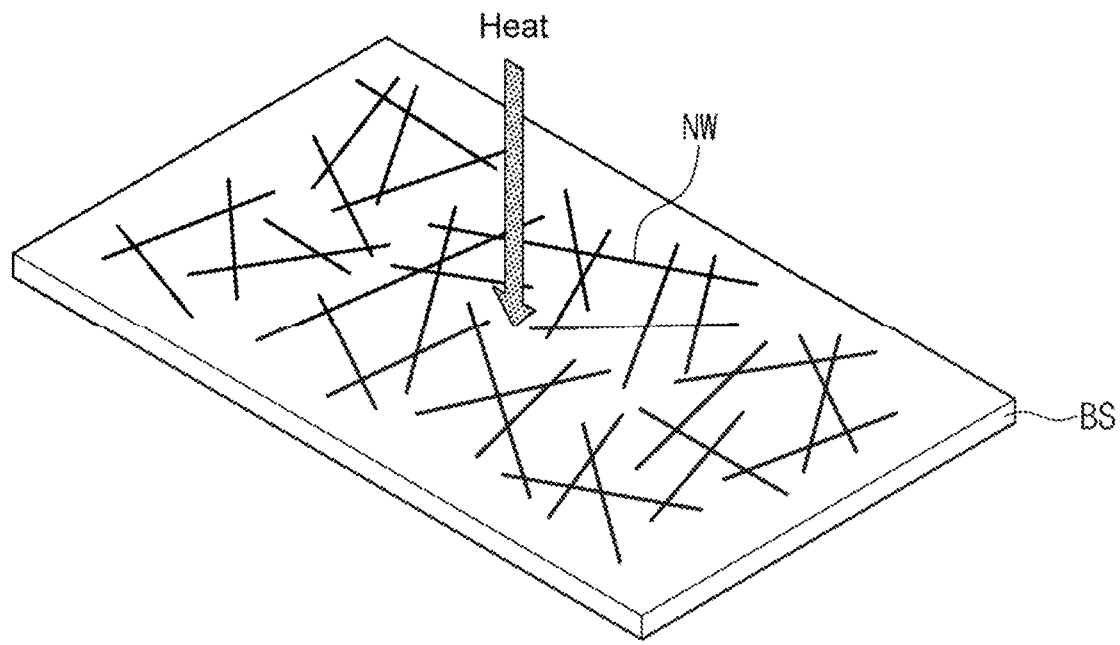
FIG. 2A and FIG. 2B are examples illustrating applying heat on the silver nanowires shown in FIG. 1.
Figure 2B:
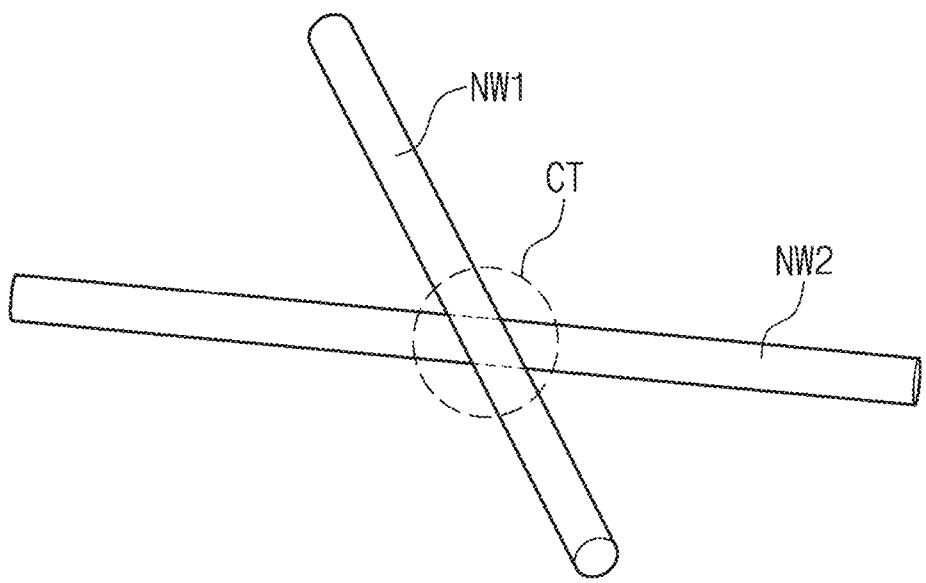

FIG. 2A and FIG. 2B are examples illustrating applying heat on the silver nanowires shown in FIG. 1.

Heating may be carried by burn-off, micro pulse photonic heating, continuous photonic heating, microwave heating, or oven heating.

Referring to FIG. 2B, the contact portion CT of a first silver nanowire NW1 and a second silver nanowire NW2 is strengthened in conductivity by the applied heat, thereby reducing the sheet resistance of the entire silver nanowires NW. More particularly, the contact portion CT of the first silver nanowire NW1 and the second silver nanowire NW2, which is not a simple physical contact, slightly melts and becomes flexible, resulting in widening a contact area which further improves overall resistance. In addition, as the silver nanowires having tension become flexible by heat, they become closer to the base substrate BS, resulting in widening a contact area which further improves the adhesion.

The heat applied to the silver nanowires NW may be about 100 to 300° C., preferably about 200 to 300° C. When the temperature is lower than 200° C., the surface resistance of the silver nanowires NW mays not be sufficiently low. On the other hand, when the temperature is higher than 300° C., a part of the base substrate BS or the silver nanowires NW may be damaged by high heat.

It may be processed even above 200° C. only when the base substrate BS is a glass substrate or a granite surface plate. On the other hand, if the base substrate BS is a substrate including a polymer, heat may cause deformation when processing at such a high temperature.

Figure 3:
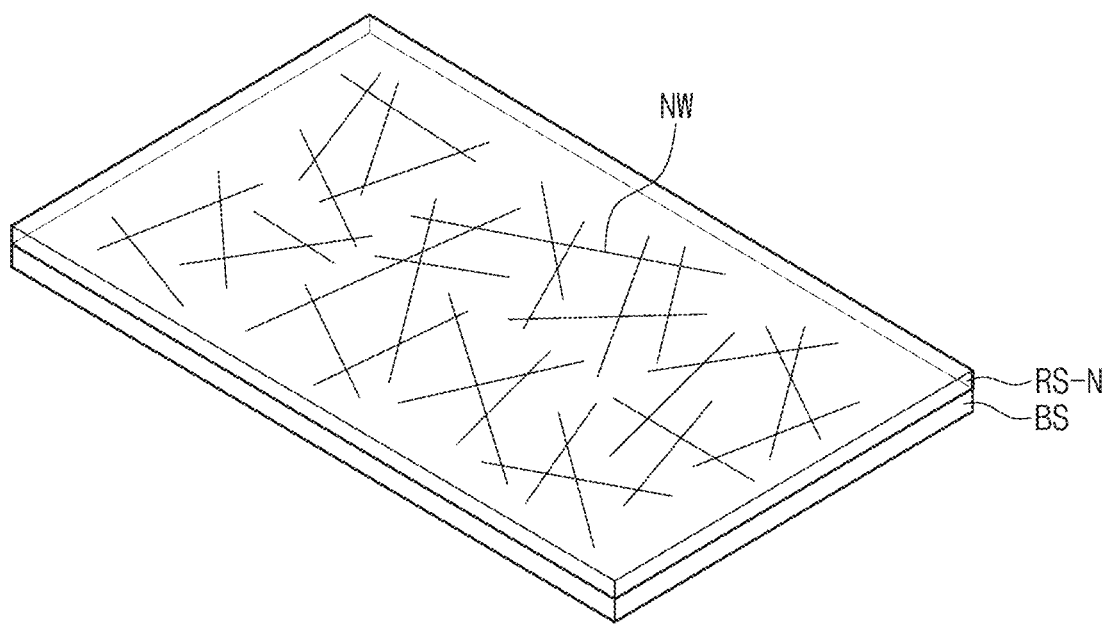
FIG. 3 is an example illustrating applying an uncured polymer to cover the silver nanowires on the base substrate shown in FIG. 1.

FIG. 3 is an example illustrating applying an uncured polymer RS-N to cover the silver nanowires NW on the base substrate BS shown in FIG. 1.

The uncured polymer RS-N may be a liquid material in the form of a gel and may be thinly applied to be about 3 μm or less through bar coding or dispensing.

The uncured polymer RS-N may be cured in response to light in a specific wavelength band and, specifically, may be cured in response to ultraviolet (UV) light.

The uncured polymer RS-N may be a material having excellent optical characteristics such as light transmittance. Since the silver nanowire NW according to an embodiment of the present invention is for manufacturing a transparent electrode, other materials may also need to secure high light transmittance to manufacture a transparent electrode.

Figure 4:
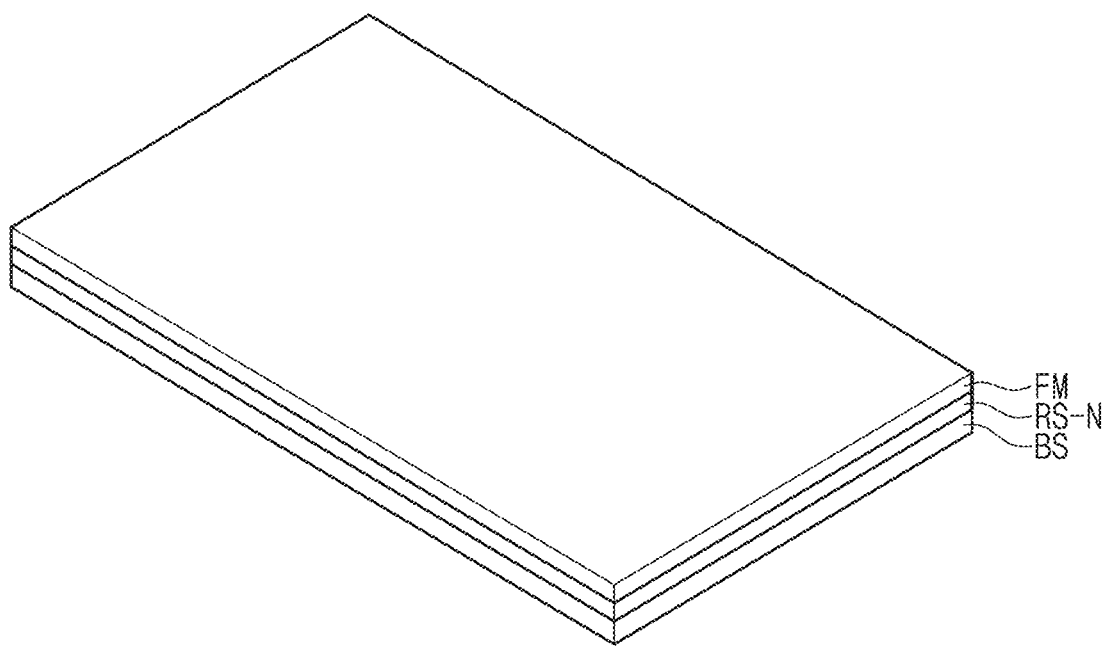
FIG. 4 is an example illustrating disposing a flexible film on the uncured polymer shown in FIG. 3.

FIG. 4 is an example illustrating disposing a flexible film FM on the uncured polymer RS-N shown in FIG. 3.

The flexible film FM may include polyethylene terephthalate (PET). Since the flexible film FM has flexibility, it may be advantageous to mount a transparent electrode on a flexible display device such as a foldable display device, a rollable display device, or a slider display device.

Figure 5A:
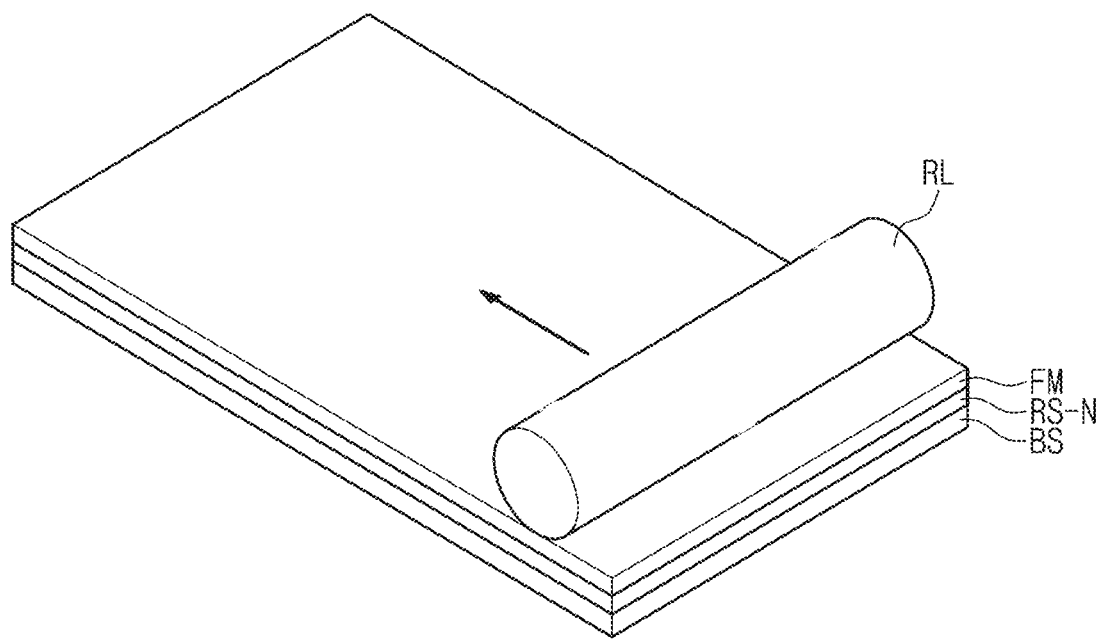
FIG. 5A is an example illustrating applying pressure to the assembly shown in FIG. 4 using a roller RL.

FIG. 5A is an example illustrating applying pressure to the assembly (FM, RS-N, BS) shown in FIG. 4 using a roller RL. FIG. 5B is a diagram illustrating comparison of the processing quality of the flexible films according to the hardness of the roller of FIG. 5A.

In order to transfer the silver nanowires NW on the base substrate BS toward the uncured polymer RS-N and the flexible film FM, a pressure may be applied to the assembly (FM, RS-N, BS) shown in FIG. 4 using a roller RL.

The hardness of the roller RL may be 30 to 50 HB, preferably about 40 HB. When the hardness of the roller RL is less than 30 HB, the hardness may be insufficient to transfer the silver nanowires NW. On the other hand, when the hardness of the roller RL is greater than 50 HB, wrinkles to the flexible film FM may be caused due to clumping or squashing, thereby deteriorating the processing quality.

Referring to FIG. 5B, the flexible film FM has a number of wrinkles on its surface which cannot secure a clean visibility to clearly see an object behind it when the hardness of the roller RL is 80 HB. On the other hand, the surface of the flexible film FM may be smooth to secure a clean visibility to clearly see an object behind it when the hardness of the roller RL is 40 HB.

Pressure may be applied with the roller RL so that a thickness of the uncured polymer RS-N may be about 4 to 6 μm. When the thickness of the uncured polymer RS-N is less than 4 μm, it may be too thin to damage the silver nanowires NW. On the other hand, when the thickness of the uncured polymer RS-N is greater than 6 μm, wrinkles may occur due to heat stress in subsequent processes. Therefore, it is preferable to make the thickness of the uncured polymer RS-N be about 4 to 6 μm in consideration of subsequent processes.

Figure 6:
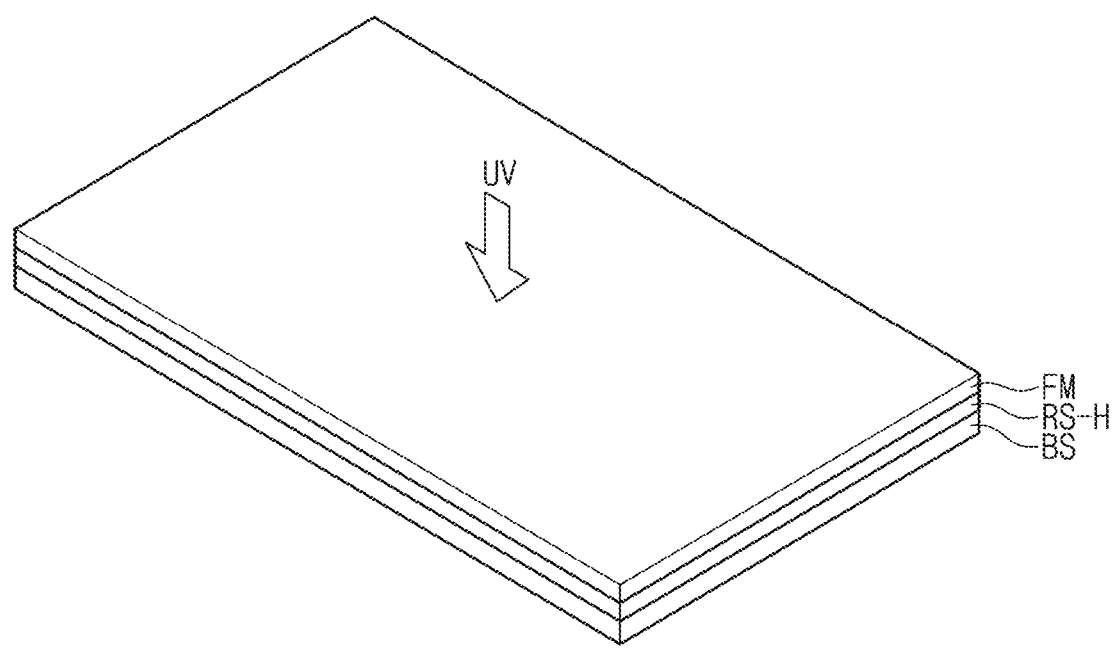
FIG. 6 is an example illustrating applying ultraviolet light to cure the uncured polymer.

FIG. 6 is an example illustrating applying ultraviolet light to cure the uncured polymer RS-N.

A light source irradiating ultraviolet light may be a lamp or an LED.

The uncured polymer RS-N may be cured within a few seconds by an acrylic polymerization reaction in response to ultraviolet (UV) light. The uncured polymer RS-N may also be cured by light in a specific wavelength band other than ultraviolet light, but it is not limited thereto.

The uncured polyether RS-N may be cured to turn into a corresponding cured polymer RS-H, whereby the silver nanowires (see FIG. 3) covered by the uncured polymer RS-N may be fixed to the cured polymer RS-H.

Figure 7:
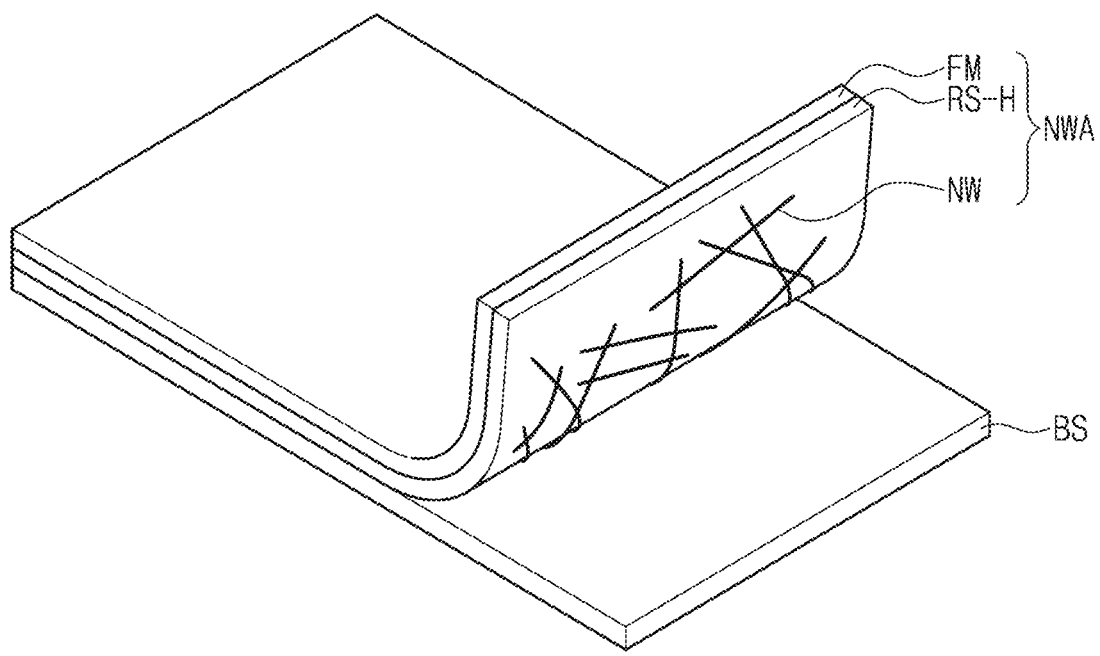
FIG. 7 is an example illustrating separating the silver nanowire assembly from the base substrate.

FIG. 7 is an example illustrating separating the silver nanowire assembly NWA from the base substrate BS.

When the cured polymer RS-H and the flexible film FM are separated from one end of the base substrate BS, the silver nanowires NW may be separated from the base substrate BS and transferred to the cured polymer RS-H.

When both the cured polymer RS-H and the flexible film FM are separated from the base substrate BS, the silver nanowire assembly NWA including the silver nanowires NW, the cured polymer RS-H, and the flexible film FM may be formed.

Figure 8A:
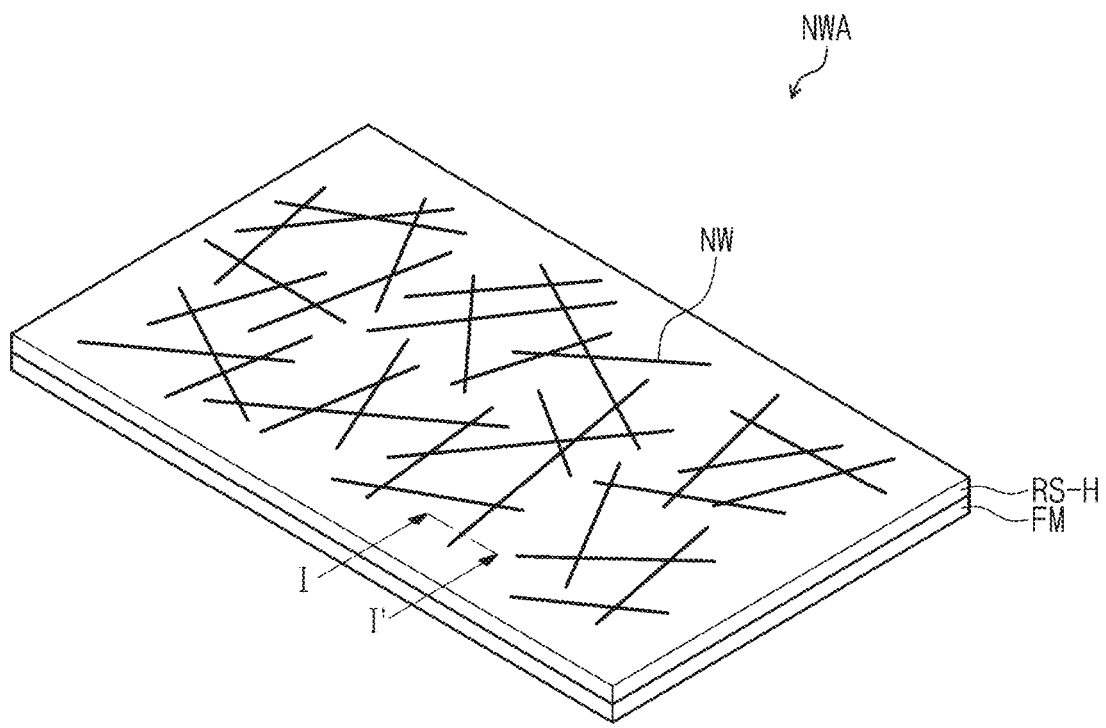
FIG. 8A is an example illustrating a silver nano wire assembly.
Figure 8B:
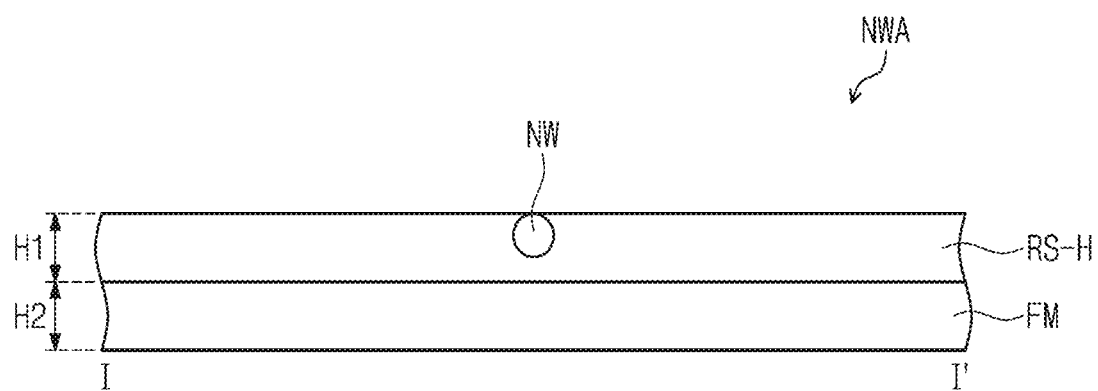
FIG. 8B is an example illustrating a cross-section taken along line of FIG. 8A.

FIG. 8A is an example illustrating a silver nanowire assembly. FIG. 8B is an example illustrating a cross-section taken along line of FIG. 8A.

Referring to FIG. 8B, the silver nanowires NW may be fixed in a form embedded in the cured polymer RS-H. This embedded form may be formed because the silver nanowires NW are covered by using the uncured polymer RS-N (see FIG. 3) in the transferring process.

A thickness H1 of the cured polymer RS-H may be about 4 to 6 μm, similar to the thickness of the uncured polymer RS-N described in FIG. 5. The reason is as described above. However, if necessary, the thickness H1 of the cured polymer RS-H may be about 4 to 15 μm.

A thickness H2 of the flexible film FM may be about 50 to 100 μm. The flexibility may decrease when the thickness H2 of the flexible film FM becomes larger than this range.

FIG. 9 is an example illustrating processing the silver nanowire assembly of FIG. 8A with a processing solution PL including an iodine mixture. FIG. 10A is an example illustrating a silver nanowire assembly processed by an iodine mixture. FIG. 10B is an example illustrating a cross-section taken along line of FIG. 10A.

The processing solution PL may include an iodine mixture and the iodine mixture may include a chloride-based mixture.

The iodine mixture including a chloride-based mixture may react with silver nanowires NW, and accordingly, corresponding silver chlorides may be formed on the surface of the silver nanowires NW so that the surface of the silver nanowires NW may turn to gray or black color. The portions where the silver nanowires NW are discolored may be referred to as discolored portions BK.

Hazy phenomenon, which is caused by an optical effect to obscure the clarity of the overall silver nanowire assembly NWA to be cloudy, may be reduced by the discolored portions BK.

A mass proportion of the chloride-based mixture in the iodine mixture may be 20 to 30%. When the mass proportion of the chloride-based mixture deviates from this range, precipitates by the iodine mixture may be formed on the surface of the silver nanowire assembly NWA and, thus, the hazy phenomenon may be increased.

When potassium is mixed in the iodine mixture in a certain ratio, discoloration may be promoted. A ratio of the iodine mixture and potassium in mass may be about 1:1 to 1:5. When the ratio is smaller than this range, the increase in a discoloration rate may be negligible. On the other hand, when it is larger than this range, a hazy problem may be increased.

The silver nanowire assembly NWA exposed to the iodine mixture to form the discoloration portions BK may be annealed. When the silver nanowire assembly NWA is processed by the iodine mixture and the sheet resistance of the silver nanowire NW is increased by about 10%, the increased resistance may be lowered through the annealing process.

The annealing process may be performed by a box oven or an IR oven.

In one embodiment of the present invention, when annealing is performed using a box oven, it may be heated at about 100 to 150° C. for about 10 to 60 minutes.

In one embodiment of the present invention, when annealing is performed using an IR oven, it may be heated at about 100 to 150° C. for about 1 to 20 minutes.

In the annealing process, when the annealing temperature and the annealing time are smaller than these ranges, the sheet resistance is not sufficiently lowered. On the other hand, when the annealing temperature and the annealing time are larger than these ranges, the silver nanowire assembly NWA may be damaged by heat.

More particularly, when annealing is performed using an IR oven, the annealing time may be adjusted based on the degree of increase in the sheet resistance. For example, when the sheet resistance of the silver nanowires NW increases by about 10% by the iodine mixture, it may be heated for about 2 minutes at 100 to 150° C., and when the sheet resistance of the silver nanowires NW increases by about 20% by the iodine mixture, it may be heated for about 5 minutes at 100 to 150° C.

FIG. 11 is a flowchart illustrating a method for manufacturing a transparent electrode according to an embodiment of the present invention, which summarizes the processes described in FIGS. 1 to 10B.

Preparing a base substrate (S100) and forming silver nanowires (S110) may correspond to FIG. 1.

Heating and cooling (S120) may correspond to FIG. 2A and FIG. 2B.

Applying an uncured polymer (S130) may correspond to FIG. 3.

Disposing a flexible film (S140) may correspond to FIG. 4.

Applying pressure (S150) may correspond to FIG. 5A and FIG. 5B.

Irradiating UV (S160) may correspond to FIG. 6.

Separating a silver nanowire assembly (S170) may correspond to FIG. 7 to FIG. 8B.

Reacting with an iodine mixture (S180) may correspond to FIG. 9 to FIG. 10B.

In one embodiment of the present invention, the step of reacting with an iodine mixture (S180) may be performed between the step of heating and cooling (S120) and the step of applying an uncured polymer (S130). In this case, the area of the silver nanowires NW reacting with the iodine mixture may be widened, thereby improving the visibility.

Annealing (S190) is not shown separately, but it was described above.

While it has been described with reference to particular embodiments, it is to be appreciated that various changes and modifications may be made by those skilled in the art without departing from the spirit and scope of the embodiment herein, as defined by the appended claims and their equivalents. Accordingly, examples described herein are only for explanation and there is no intention to limit the disclosure. The scope of the present disclosure should be interpreted by the following claims and it should be interpreted that all spirits equivalent to the following claims fall with the scope of the present disclosure.

INDUSTRIAL AVAILABILITY

Transparent electrodes that are not easily recognized by human eyes are widely used in fields related to various electric devices including the display field.

Therefore, a method for manufacturing a transparent electrode with low sheet resistance and improved visibility of the present invention has high industrial applicability.

What is claimed is:

1. A method for manufacturing transparent electrodes, the method comprising:
   preparing a base substrate;
   forming a silver nanowire contacting one surface of the base substrate;
   heating the base substrate and the silver nanowire at a predetermined temperature;
   applying an uncured polymer to the one surface of the base substrate to cover the silver nanowire;
   disposing a flexible film on the uncured polymer;
   applying a predetermined pressure between the disposed flexible film and the base substrate;
   irradiating light having a specific wavelength on the flexible film and curing the uncured polymer to produce a cured polymer;
   separating the base substrate and the cured polymer so that the silver nanowire is separated from the base substrate and bonded to the cured polymer, thereby forming a silver nanowire assembly comprising the silver nanowire, the cured polymer, and the flexible film;
   exposing the silver nanowire assembly to an iodine mixture including a chloride-based mixture and potassium for a predetermined time such that only a part of a surface of the silver nanowire changes to silver chloride having a gray or black color and the remaining part of the surface of the silver nanowire maintains conductivity; and
   annealing the silver nanowire assembly exposed to the iodine mixture at a temperature of 100° C. to 110° C. for 2-5 minutes,
   wherein the predetermined pressure is applied by rolling of a roller having a hardness of 30 HB to 50 HB.

2. The method of claim 1, wherein the base substrate is a glass substrate.

3. The method of claim 1, wherein the base substrate is a granite surface plate.

4. The method of claim 1, wherein the flexible film includes PET.

5. The method of claim 1, wherein the predetermined temperature is 200° C. to 300° C.

6. A method for manufacturing transparent electrodes, the method comprising:
  preparing a base substrate;
  forming a silver nanowire contacting one surface of the base substrate;
  heating the base substrate and the silver nanowire at a predetermined temperature;
  producing a discolored silver nanowire by exposing the silver nanowire to an iodine mixture including a chloride-based mixture and potassium for a predetermined time such that only a part of a surface of the silver nanowire changes to silver chloride having a gray or black color and the remaining part of the surface of the silver nanowire maintains conductivity;
  applying an uncured polymer to the one surface of the base substrate to cover the discolored silver nanowire;
  disposing a flexible film on the uncured polymer;
  applying a predetermined pressure between the disposed flexible film and the base substrate;
  irradiating light having a specific wavelength on the flexible film and curing the uncured polymer to produce a cured polymer;
  separating the base substrate and the cured polymer so that the discolored silver nanowire is separated from the base substrate and bonded to the cured polymer, thereby forming a silver nanowire assembly comprising the discolored silver nanowire, the cured polymer, and the flexible film; and
  annealing the silver nanowire assembly at a temperature of 100° C. to 110° C. for 2-5 minutes,
  wherein the predetermined pressure is applied by rolling of a roller having a hardness of 30 HB to 50 HB.

* * * * *